(12) United States Patent
Eurlings

(10) Patent No.: US 11,181,235 B2
(45) Date of Patent: Nov. 23, 2021

(54) DUPLEX CONSTRUCTIVE PRESSURE VESSEL ELEMENT

(71) Applicant: ARRANGED BV, Bilzen (BE)

(72) Inventor: Martin Eurlings, Bilzen (BE)

(73) Assignee: ARRANGED BV, Bilzen (BE)

( * ) Notice: Subject to any disclaimer, the term of this patent is extended or adjusted under 35 U.S.C. 154(b) by 0 days.

(21) Appl. No.: 16/066,541

(22) PCT Filed: Dec. 29, 2016

(86) PCT No.: PCT/EP2016/082800
§ 371 (c)(1),
(2) Date: Jun. 27, 2018

(87) PCT Pub. No.: WO2017/114880
PCT Pub. Date: Jul. 6, 2017

(65) Prior Publication Data
US 2019/0003644 A1    Jan. 3, 2019

(30) Foreign Application Priority Data

Dec. 30, 2015 (EP) ..................................... 15203222
Apr. 26, 2016 (EP) ..................................... 16167011
Sep. 16, 2016 (EP) ..................................... 16189246

(51) Int. Cl.
*F17C 1/00* (2006.01)
*F17C 1/12* (2006.01)
(Continued)

(52) U.S. Cl.
CPC .................. *F17C 1/12* (2013.01); *F17C 1/14* (2013.01); *F17C 13/08* (2013.01); *F17C 13/081* (2013.01);
(Continued)

(58) Field of Classification Search
CPC ...... F17C 1/00; F17C 1/02; F17C 1/12; F17C 1/14; F17C 13/081; F17C 2203/0626;
(Continued)

(56) References Cited

U.S. PATENT DOCUMENTS 3,069,045 A * 12/1962 Haumann ............. A47J 41/028
220/592.27
3,119,238 A    1/1964 Chamberlain et al.
(Continued)

FOREIGN PATENT DOCUMENTS

DE        1551392 A1    3/1970
WO    2014139967 A1    9/2014

OTHER PUBLICATIONS

International Search Report from PCT Application No. PCT/EP2016/082800, dated Apr. 4, 2017.
(Continued)

*Primary Examiner* — Stephen J Castellano
(74) *Attorney, Agent, or Firm* — Workman Nydegger

(57) ABSTRACT

A compressed pressure vessel suitable for serving as construction element for building energy storage constructions thereof is described. The compressed pressure vessel comprises a first, inner, segment, wherein the inner segment comprises an inlet for filling or emptying the inner segment and wherein the inner segment is suitable for storing hydrogen, and a second, outer, segment, the outer segment adapted for being filled with a fluid, different from hydrogen, wherein the outer segment is substantially fully encompassing the inner segment.

22 Claims, 8 Drawing Sheets

(51) Int. Cl.
  *F17C 1/14*    (2006.01)
  *F17C 13/08*   (2006.01)
(52) U.S. Cl.
  CPC ............... *F17C 2203/0626* (2013.01); *F17C 2203/0639* (2013.01); *F17C 2203/0646* (2013.01); *F17C 2203/0648* (2013.01); *F17C 2203/0663* (2013.01); *F17C 2205/0134* (2013.01); *F17C 2205/0138* (2013.01); *F17C 2221/012* (2013.01); *F17C 2221/013* (2013.01); *F17C 2221/014* (2013.01); *F17C 2265/04* (2013.01); *Y02E 60/32* (2013.01)
(58) Field of Classification Search
  CPC ...... F17C 2203/0639; F17C 2203/0646; F17C 2203/0648; F17C 2203/0663; F17C 2205/0138; F17C 2221/012; F17C 2221/013; F17C 2221/014; F17C 2265/04; C25B 9/05; Y02E 60/36; Y02E 60/32
  USPC .............................................. 220/560.1, 585
  See application file for complete search history.

(56) References Cited

U.S. PATENT DOCUMENTS

| | | | |
|---|---|---|---|
| 3,176,473 A | 4/1965 | Andonian | |
| 4,548,335 A * | 10/1985 | Remes | B65D 81/3811 220/560.1 |
| 5,960,633 A * | 10/1999 | Limbach | F17C 1/12 62/45.1 |
| 6,734,112 B2 * | 5/2004 | Worm | D06F 43/00 134/1.1 |
| 7,886,940 B2 * | 2/2011 | Lavan | B65D 90/046 220/585 |
| 8,141,739 B2 * | 3/2012 | Sakaguchi | F17C 1/00 220/562 |
| 8,435,700 B2 * | 5/2013 | Okawachi | H01M 8/04388 429/515 |
| 8,978,920 B2 * | 3/2015 | Breuer | F17C 1/005 220/586 |
| 9,211,683 B2 * | 12/2015 | Emori | B29D 22/003 |
| 9,546,800 B2 * | 1/2017 | Devriese | F24S 10/30 |
| 2008/0128145 A1 * | 6/2008 | Butz | A62C 31/02 169/46 |
| 2010/0307156 A1 * | 12/2010 | Bollinger | H02J 15/006 60/682 |
| 2016/0046795 A1 * | 2/2016 | Bullock | B64B 1/40 220/677 |

OTHER PUBLICATIONS

Sterner et al., "Bioenergy and Renewable Power Methane in Integrated 100% Renewable Energy Systems Limiting Global Warming by Transforming Energy Systems," Abstract, Kassel University Press, ISBN 978-3-89958-798-2, 2009, 5 pages.

\* cited by examiner

DUPLEX CONSTRUCTIVE PRESSURE VESSEL ELEMENT

This is the national stage (Rule 371) of international application No. PCT/EP2016/082800 filed 29 Dec. 2016.

FIELD OF THE INVENTION

The invention relates to the field of energy harvesting. More specifically it relates to energy harvesting constructions, such as energy harvesting towers or substantially horizontal systems as well as to elements for constructing such energy harvesting constructions and to methods of energy harvesting.

BACKGROUND OF THE INVENTION

The quest for environmental friendly and renewable energy is one of the most tempting challenges of today. Some proposed solutions relate to wind turbines and solar towers. In International patent application WO2014/139967 efficient energy storage solutions are described, whereby wind turbines or solar towers are towers built of compressed pressure vessels.

In the compressed pressure vessels forming such wind turbines or solar towers, the energy harvested from wind or solar energy is typically converted to hydrogen gas, thus allowing to store the energy in the form of hydrogen gas. Hydrogen gas can cause hydrogen embrittlement in metal materials. Since the CPV is a constructive part of the tower structure and since the consideration should be that expected service life of the tower would be at 15 to 20 years, only expensive and difficult to process materials (machining & welding) like for example stainless steel AISI316L could be used for the construction of the CPV.

Sterner et al. describes in "Bioenergy and renewable power methane in integrated 100% renewable energy systems: Limiting global warming by transforming energy systems", ISBN: 978-3-89958-798-2, 2009, systems for forming methane at wind turbines or solar towers using stored hydrogen gas. This requires additional production of carbon dioxide, as well as different reservoirs for storing the reagens and the products. Other techniques, wherein hydrogen gas is harvested from a particular tower and converted through chemical reaction in other chemical components are also known.

Consequently, there is room for improving towers, such as wind turbines or solar towers, adapted for storing energy in the shape of gas.

SUMMARY OF THE INVENTION

It is an object of embodiments of the present invention to provide good compressed pressure vessels for building an energy storage tower for storing hydrogen.

It is an advantage of embodiments of the present invention that an energy storage construction such as an energy storage tower or a substantially horizontal energy storage system can be built based on compressed pressure vessels that allow storing hydrogen while avoiding deterioration of the compressed pressure vessels.

It is an advantage of embodiments of the present invention that compressed pressure vessels are provided that can act as constructive parts of the construction such that the construction maintains sufficiently stable over an expected service life of the construction of at least 15 to 20 years.

It is an advantage of embodiments of the present invention that an energy storage construction can be built using compressed pressure vessels made of materials that are relatively cheap and are relatively easy to process.

The above objective is accomplished by a method and device according to the present invention.

The present invention relates to a compressed pressure vessel suitable for serving as construction element for building energy storage constructions thereof, the compressed pressure vessel comprising
a first, inner, segment, wherein the inner segment comprises an inlet for filling or emptying the inner segment and wherein the inner segment is suitable for storing hydrogen, and
a second, outer, segment, the outer segment adapted for being filled with a fluid, different from hydrogen,
wherein the outer segment is substantially fully encompassing the inner segment.

The inner segment suitable for storing hydrogen may have a wall made of a low hydrogen diffusion or permeation material.

The low hydrogen diffusion or permeation material may be any of Aluminum, Aluminum alloy, Polyethylene, a composite material based on carbon, glass or aramide fibers. Alternatively or in addition thereto coatings can be applied to the walls to form a hydrogen permeation barrier. The most favorable coatings are Al/$Al_2O_3$ and double layer $Al_2O_3$/Fe—Al coatings. Al—Si or Graphene coatings have shown good permeation barrier properties in recent research papers and therefore also can be used. Such coating can be applied to the inner side of the walls of the inner segment. The coatings may also be lined with such a low permeation material.

Natively grown oxides can be used as permeation barriers as well, in particular $Cr_2O_3$. These coatings are applied on the inner side of the segment.

According to embodiments of the present invention both an inner segment and an outer segment are present. The inner segment is encompassed by the outer segment. Advantageously, the inner segment and outer segment are concentric along the same longitudinal axis of the segments.

According to embodiments of the present invention, the volume of the inner segment and the outer segment is fixed, i.e. it is not variable.

It is an advantage of embodiments of the present invention that the inner segment and the outer segment can be separated from each other without irreversibly damaging the segments and structures.

In embodiments of the present invention the different segments are suitable for being filled with distinct fluids. In embodiments of the present invention, each fluid, e.g. each gas, may have its own input/output port.

It is an advantage of embodiments of the present invention that the fluid, e.g. gas, stored in the outer segment can be selected such that the fluid cannot destroy or significantly deteriorate the material of which the outer segment is made. The fluid stored in the outer segment can be selected such that it does not or does not significantly oxidizes, reduces or dissolved the material of the outer segment.

The outer segment may be made of a construction steel. It is an advantage of embodiments of the present invention that the outer shell can be made of normal and cheap construction steel, such as for example Steel 52, whereby the material has better mechanical, welding and machining properties. It is an advantage of embodiments of the present invention that the outer segment can carry all or nearly all mechanical loads. The outer segment can comprise substantially more material for the construction than the inner segment.

The outer segment may comprise an inlet for reversibly filling and emptying the outer segment with said fluid different from hydrogen.

The outer segment may be adapted for storing therein and collecting therefrom any of nitrogen gas or carbon dioxide gas.

The compressed pressure vessel may comprise a burst valve or a sample valve.

A plurality of inner segments may be provided.

The inlet of the plurality of inner segments may be combined into a single flange or distribution head.

The inner segment may be spaced from the walls of the outer segment by spacers.

The spacers may be any or a combination of springs or elastic elements such as for example elastomers or rubbers.

The spacers may be adapted such that the inner segment is moveable for adjusting a position of the inner segment, e.g. for adjusting a sealing position of the inner segment when it is to be connected to another inner segment during construction of an energy storage construction.

The compressed pressure vessel may comprise a leakage detector for detecting leakage of hydrogen from the inner segment.

The construction of the inner and outer segment may be adapted for storing hydrogen and the other fluid at substantially the same pressure. It is an advantage of embodiments of the present invention that by balancing the pressure in the inner and the outer segment, the wall of the inner segment can be rather thin. It is an advantage of embodiments of the present invention that the amount of material that is required for forming the inner segment can be limited, which also results in a substantial cost advantage.

The present invention further relates to a component for an energy storage construction, e.g. a tower or substantially horizontal construction, or for a pipeline, the component comprising an assembly of connected compressed pressure vessels, wherein the assembly of connected compressed pressure vessels comprises one or more first, inner, segments, wherein the one or more inner segments comprise an inlet for filling or emptying the inner segment and wherein the inner segment is suitable for storing hydrogen, and one or more second, outer, segment, the one or more outer segments adapted for being filled with a fluid, different from hydrogen.

The assembly of connected compressed pressure vessels may be a plurality of connected compressed pressure vessels all have closed head caps, thus all forming individual compressed pressure vessels.

The assembly may comprise a plurality of second, outer, segments joint-connected to each other.

The inner segment may be a single segment inserted into the plurality of joint-connected second outer segments.

The inner segment may be an assembly of joint-connected first, inner segments.

The component may comprise distance keepers for aligning the one or more inner segments with respect to the one or more outer segments.

The distance keepers may be installed at the inside of the one or more outer segments or at the outside of the one or more inner segments and/or are installed at positions were inner or outer segments have joint connections.

The compressed pressure vessel may be as described above.

The present invention also relates to a pipeline comprising a compressed pressure vessel or a component as described above.

The present invention also relates to an energy storage construction such as for example an energy storage tower or a substantially horizontal energy storage construction, the energy storage construction comprising at least one compressed pressure vessel as described above as constructive element of the energy construction or a component as described above.

All constructive elements of the energy construction may be compressed pressure vessels as described above.

The energy harvesting construction may be a construction supporting solar panels.

Where in embodiments of the present invention solar panels are mentioned, reference may be made to thermal solar panels wherein solar energy conversion is based on heating of a substance by solar energy, reference may be made to photovoltaic cells, or more generally reference may be made to any type of system converting solar energy into another type of energy.

The energy harvesting construction may be a substantially horizontal energy harvesting construction. The energy harvesting construction may be configured for using energy obtained from solar panels for generating hydrogen, for producing ammonia, methane or nitric acid, or for other chemical or physical processes.

The present invention also relates to the use of a compressed pressure vessel or component as described above for storing and collecting therefrom hydrogen.

The present invention also relates to the use of a compressed pressure vessel or component as described above for storing and collecting therefrom hydrogen and another fluid.

The present invention also relates to the use of a compressed pressure vessel or component as described above for the production of a chemical composition by a hydrogenation of hydrogen gas.

The present invention also relates to the use of a compressed pressure vessel or component as described above for the production of ammonia.

The present invention also relates to the use of a compressed pressure vessel or component as described above for the production of methane.

The present invention also relates to the use of a compressed pressure vessel or component as described above for the production of nitric acid.

The present invention also relates to the use of a compressed pressure vessel or component as described above for the continuous production of ammonia, of methane or of nitric acid or any other chemical composition, whereby continuous production is a production 24 h per day, 7 days a week, except for maintenance, making use of at least temporary stored hydrogen.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
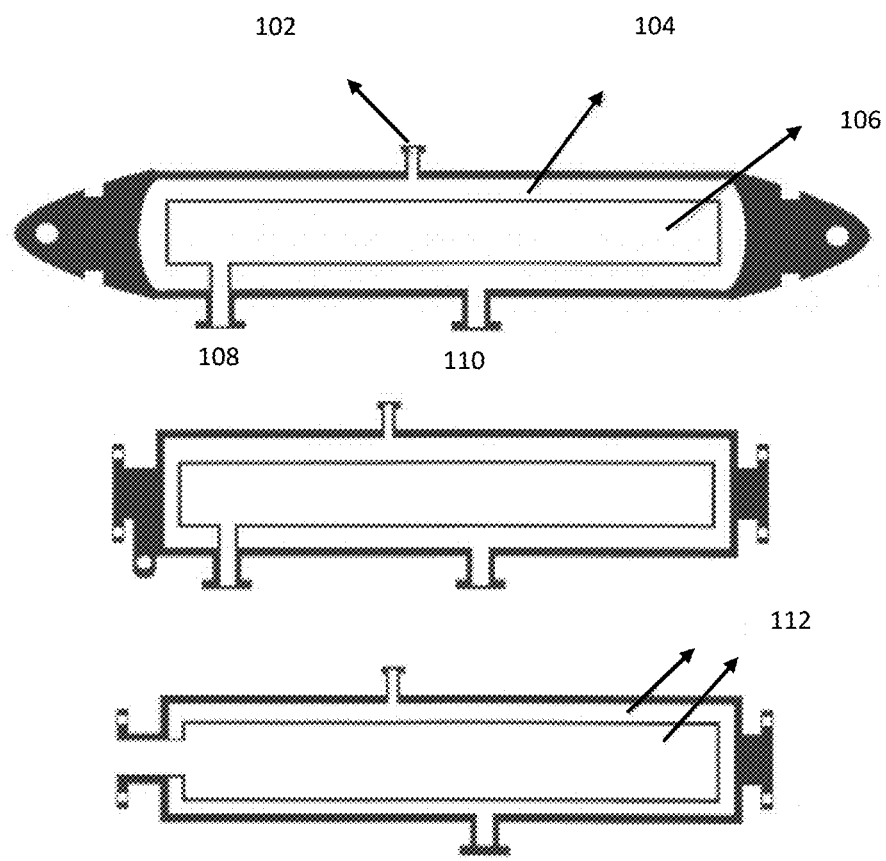
FIG. 1 to FIG. 4 illustrate multiple segment compressed pressure vessels according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is to be noted that, whereas in embodiments of the present invention reference is made to a duplex compressed pressure vessel or a dual segment compressed pressure vessel, the present invention is not limited to compressed pressure vessels wherein only two different compounds can be stored, i.e. wherein only two compartments, also referred to as segments, are present. The number of compartments thus does not need to be limited to two different compartments, but is at least two, and can for example be three different compartments, four different compartments, etc.

The wall materials selection (mono-materials, laminates or composites structures) for the inner segment should be done based on the criteria that it should have low hydrogen embrittlement properties (metals) and/or low hydrogen diffusion values, and these at the operating temperatures and operating pressures the dCPV's will be used at.

The material selection for the outer segment is mainly driven by the mechanical, processing (welding, machining), maintenance (anti-corrosion, coating) and strength properties.

In a first aspect, the present invention relates to a dual segment compressed pressure vessel. The compressed pressure vessel comprises a first, inner, segment, wherein the inner segment comprises an inlet for filling or emptying the inner segment and wherein the inner segment is suitable for storing hydrogen. The compressed pressure vessel furthermore comprises a second, outer, segment, the outer segment adapted for being filled with a second gas, different from hydrogen, and the outer segment substantially fully, e.g. except for the inlet of the inner segment, encompassing the inner segment. In other words, the walls of the inner segment do not form the outer wall of the compressed pressure vessel. The latter results in the fact that hydrogen is not in direct contact with the outer walls, such that hydrogen cannot cause embrittlement or deterioration of the outer walls of the compressed pressure vessel. The latter is advantageous as the outer walls can for example be selected for being the walls that provide the strength to the compressed pressure vessel for acting as a constructing element.

In advantageous embodiments, the outer segment of the compressed pressure vessel also has an inlet and the compressed pressure vessel allows storage and collecting of the second gas, being different from hydrogen. Advantageously such dual storage may be used for storing hydrogen and another gas that can be used in the production of a chemical compound such that the two reagents can be harvested from the same compressed pressure vessel.

FIG. 1 illustrates three examples of a compressed pressure vessel according to the first aspect, wherein different configurations for the inlet are shown. In the example shown, the outer segment of the tank is filled with nitrogen gas or carbon dioxide gas 104 and the inner segment is filled with the hydrogen gas 106. This way, the material for the outer shell of the CPV could be made of normal and cheaper construction material such as Steel 52, which has better mechanical, welding and machining properties. The outer segment typically may carry all the mechanical loads and may consume most material for the construction. FIG. 1 shows different construction concepts. The duplex CPV (dCPV) may have a burst valve 102 or sample valve.

The material for the inner vessel, in which the hydrogen is stored, can be a low diffusion and/or low permeation hydrogen material, like for example Aluminium, Polyethylene, composite materials (e.g. based on carbon fibers). Or combinations (laminates) of materials, lined metal materials or coated materials using for examples $Al/Al_2O_3$ or double layer $Al_2O_3/Fe$—Al coatings. Grown oxides on the metal surface could also being used as permeation barriers, in particular $Cr_2O_3$.

According to some embodiments, the compressed pressure vessel is adapted such that, in use, the pressure should be balanced in the outer and inner segment. This allows the inner segment to have a rather thin wall, which again a substantial cost advantage.

Figure 2:
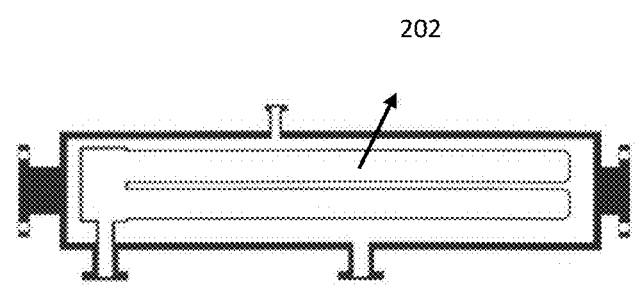

FIG. 2 shows a configuration with multiple inner segments 202, combined into one flange or distribution head. For some material options this could be an advantageous method to limit the wall thickness or to increase the inner pressure resistance.

Figure 3:
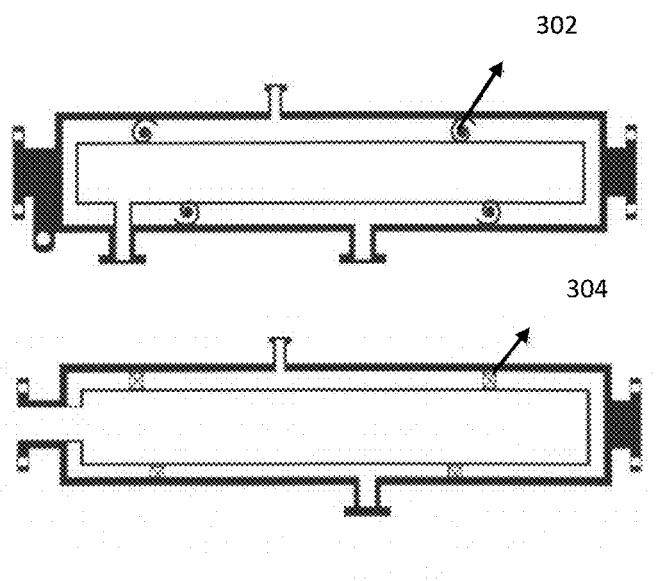

FIG. 3 shows different spacer configurations. The inner segment may be spaced from the walls of the outer segments in different ways. Such spacing removes or reduces possible vibrations generated by the tower structure and prevents that possible vibrations are directly transmitted to the inner segment. During the building of the tower such spacer could facilitate the connection of the different inner segments, for example when they are inline interconnected. If the spacers are springs 302 or elastomers 304 (eg rubbers), the inner segment could be slightly moveable such as to move into the correct sealing position to connect the next inner segment.

Figure 4:
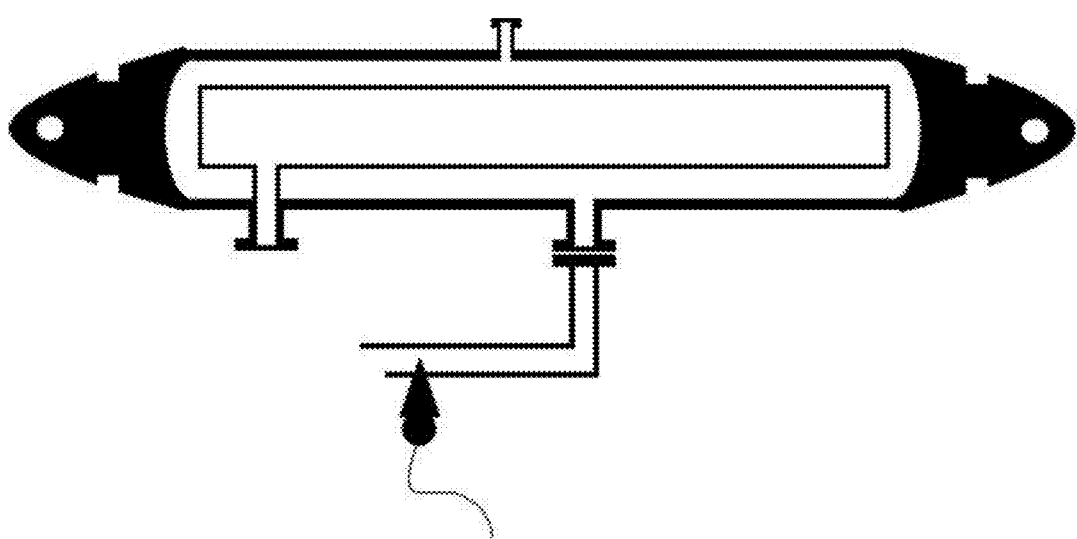

FIG. 4 it would be advantageous to put a hydrogen detector in the outer segment connection lines downstream of the dCPV. That would allow detecting a possible leak in the inner segment (filled with hydrogen), increasing the safety of the whole tower concept. Even if hydrogen would leak into the outer segment, that would not cause an immediate risk, since typically an inert gas will be stored in the outer segment.

Embodiments of the present invention advantageously can be used in energy harvesting systems wherein hydrogen gas will be converted through chemical reaction in another chemical substance for the energy harvesting.

An example thereof is conversion of hydrogen through chemical reaction with nitrogen into $NH_3$ (ammonia). Such conversion can be performed either at the tower structure or at a fixed or mobile installation near the tower structure. Instead of storing each chemical substance (e.g. hydrogen and nitrogen) separately in a dedicated gas tower, it could be advantageous to store the 2 gasses in one or more duplex CPV of the tower structure.

An example thereof is a conversion of hydrogen through chemical reaction with $CO_2$ into $CH_4$ (methane). Such conversion can be performed either at the energy storage construction or at a fixed or mobile installation near the energy storage construction. The $CO_2$ can be either produced by a separate source or may be stored in an energy storage construction. Instead of storing each of the chemical substances (e.g. hydrogen and carbon dioxide) separately in a dedicated gas tower, it could be advantageous to store the 2 gasses in one or more duplex CPV of the construction.

In yet another example, conversion of hydrogen through chemical reaction into nitric acid is envisaged.

The present invention also relates to a component for an energy construction, such as for example an energy storing tower. Such a component typically may be referred to as a leg of the energy construction. The component of the energy construction comprises one compressed pressure vessel or an assembly of connected compressed pressure vessels. The one or more compressed pressure vessels comprise one or more first, inner, segments, wherein the one or more inner segments comprise an inlet for filling or emptying the inner segment and wherein the inner segment is suitable for storing hydrogen, and one or more second, outer, segment, the one or more outer segments adapted for being filled with a fluid, different from hydrogen, Further standard and optional features will further be illustrated with reference to FIG. 5 to FIG. 8, embodiments of the present invention not being limited thereto.

Figure 5:
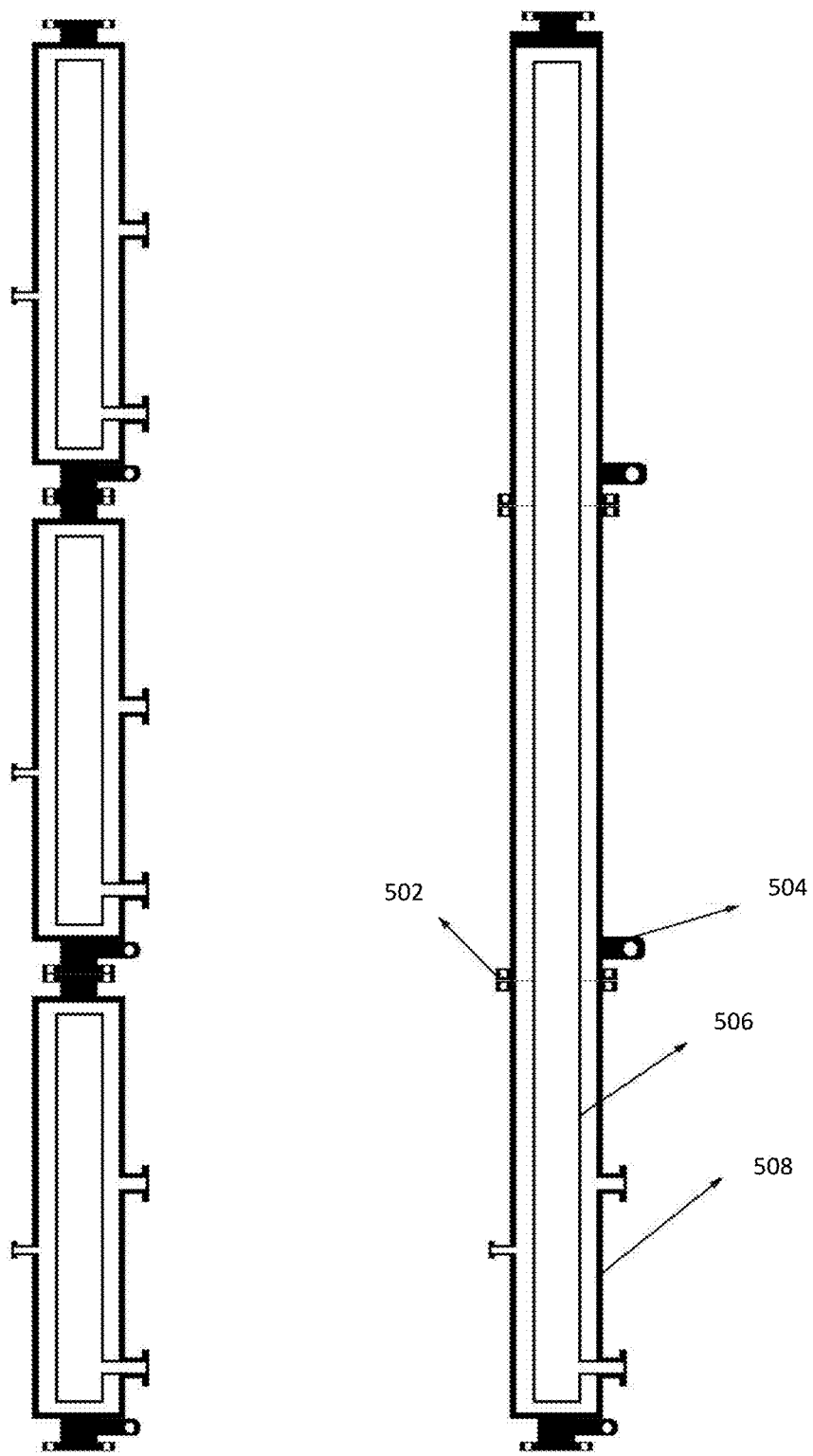
FIG. 5 illustrates different possible configurations for a leg of an energy tower made of compressed pressure vessels, according to an embodiment of the present invention.

FIG. 5 shows examples of legs of a tower. On the left hand side of FIG. 5, an assembly of stacked individual dCPV's is shown, with each of the dCPV's having closed head caps. In a vessel the head caps take most of the mechanical forces, that's the reason why the head caps have to be constructed in rather thick material.

To lower the cost of the tower structure, it would be advantageous installing the dCPV in a serial configuration as shown in right assembly in FIG. 5. The dCPV's in this exemplary embodiment are joint-connected with flanges or welds and only 2 head caps are necessary per tower leg. FIG. 5 shows the pressure tight connection means 502 between two outer wall segments of the dCPV. Less head caps means also more operational storage volume in the complete tower structure. FIG. 5 also shows the lifting connection point 504, an inner wall 506 and an outer wall 508.

Due to the use of flanges or welds, the inner diameter of the outer vessel would be large enough at most positions, to insert a long inner vessel. This inner vessel could be made for example out of Polyethylene, although embodiments are not limited thereto.

Figure 6:
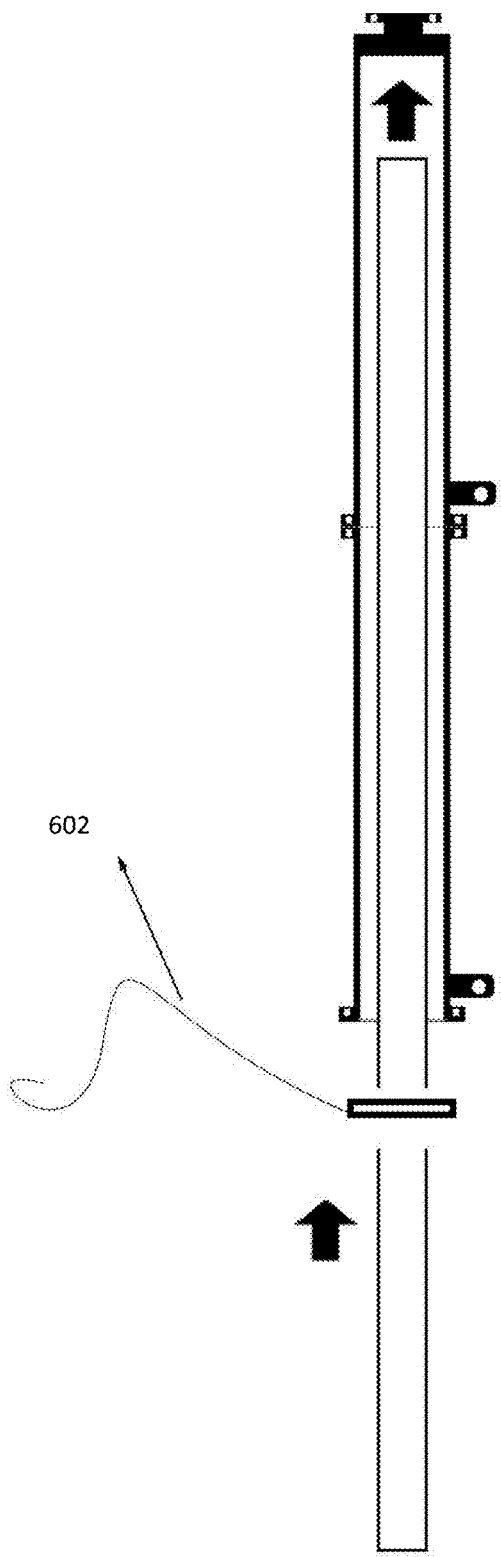
FIG. 6 illustrates a method of joining inner segments, as can be used in embodiments of the present invention.

FIG. 6 shows an example if the inner Polyethylene vessel is being thermally welded, to form a long vessel. It illustrate a joining technique 602 for the inner walls. In case of Aluminium, it could be for example metal inert gas (MIG) or tungsten inert gas (TIG) welded. Another advantage is that due to the thin wall thickness of the inner vessel, inspection means to verify welding seam properties, using Ultrasonic or X-Ray NDE/NDT inspections are much easier to conduct and could be done at the location of the assembly.

Of course the inner vessel will have 2 head caps to form a closed pressure vessel. It has been said before; each segment will have its filling/emptying nozzle.

Figure 7:
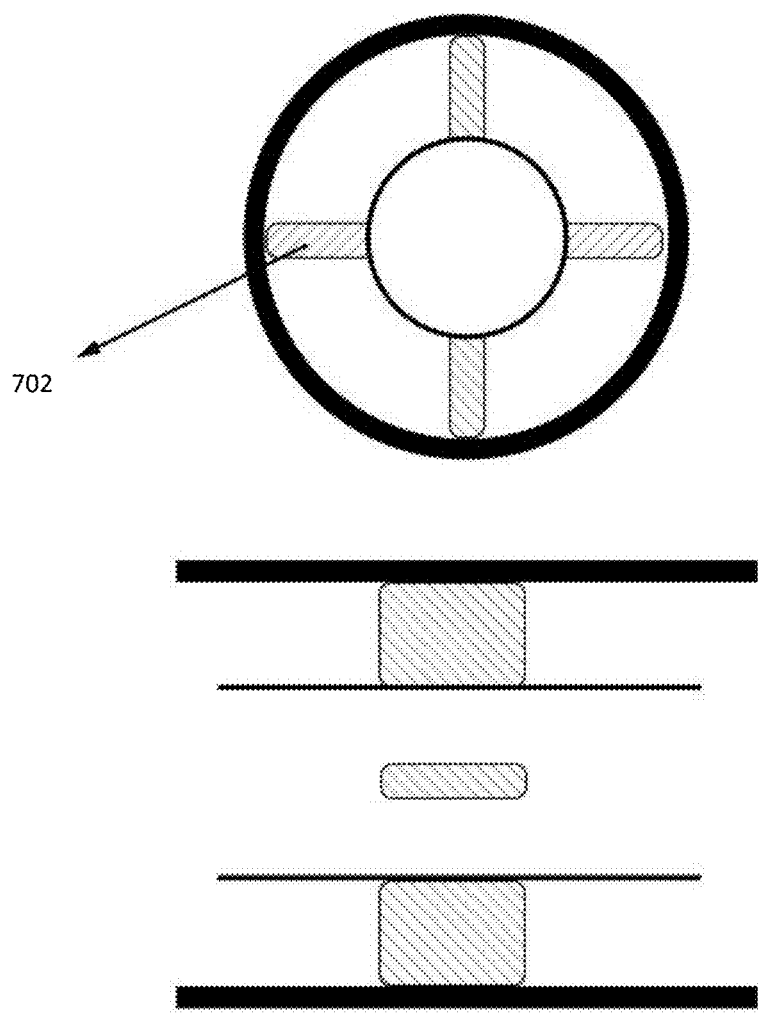
FIG. 7 illustrates the use of distance keepers in a multiple segment compressed pressure vessels assembly, according to an embodiment of the present invention.

FIG. 7 shows that it would be helpful, at some points of the long inner segment, to install distance keepers 702, so that the inner vessel is well aligned in the outer vessel and/or reduce possible vibrations of the inner vessel One could even consider installing them where the joint-connections (weld or seal or other type of connection) are located, for example for the inner vessel.

These distance keepers could be installed on the inside of the outer vessel or at the outside of the inner vessel.

Figure 8:
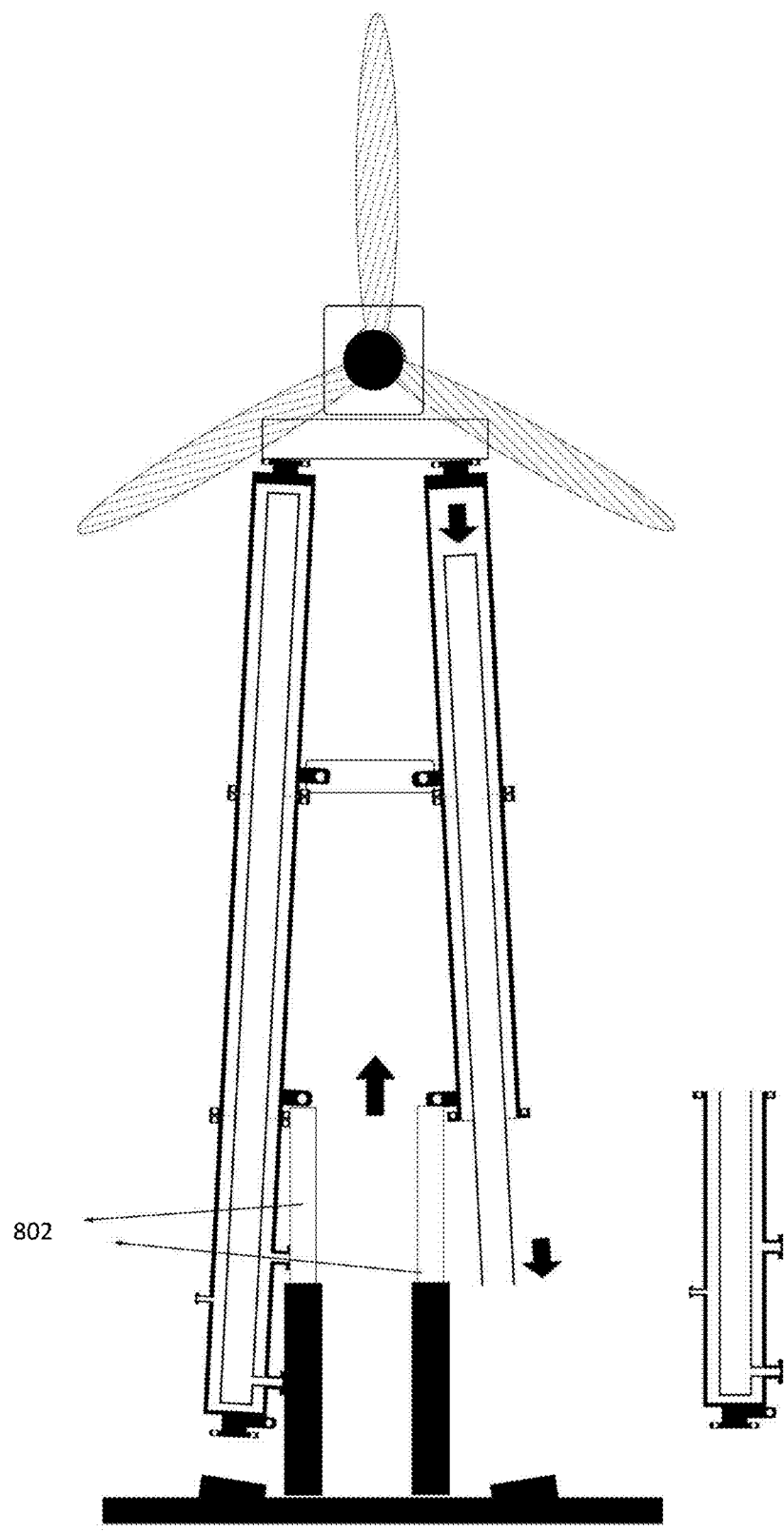
FIG. 8 illustrates an example of a method for repairing a leg or inner pressure vessel of an energy tower, as can be used in embodiments of the present invention.

As disclosed in WO2014/139967, it is possible to construct a tower structure by pushing up the tower and adding additional elements at the bottom side. If this technique is used, it could be also used in case the inner tube would show hydrogen or pressure leaks to conduct a repair. The actions taken are pushing upwards the complete tower structure, remove the bottom dCPV, pull out the inner vessel (which probably may have to be cut into sizeable parts to remove them). The latter is illustrated in FIG. 8, showing hydraulic lifters 802. When the complete inner vessel is removed, a new inner vessel can be inserted in the dCPV. Assuming a leak would be located at the lower part of the inner vessel, it could be sufficient to just partially remove and replace some defective vessel parts and replace it with a new part. It is to be noted that the inner vessel is most sensitive, since this stores the hydrogen gas.

It further is to be noted that a serial assembly per leg of dCPV's also results in a reduced amount of burst valves, In/Outlet nozzles, easier control of the balancing between the inner and the outer segment.

Figure 9:
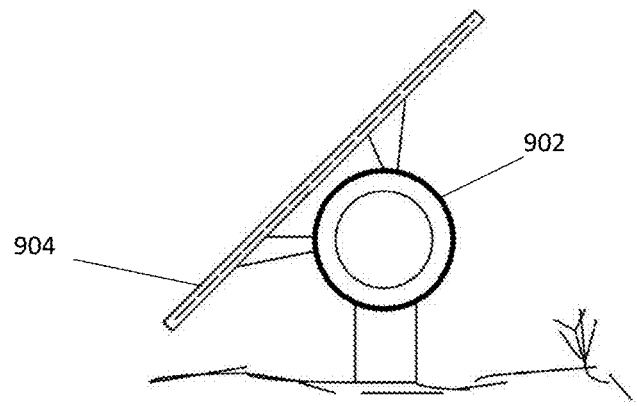
FIG. 9 illustrates an energy storage construction being substantially horizontal and comprising a solar panel, according to an embodiment of the present invention.

Whereas with respect to FIG. 5 to FIG. 8, a tower construction has been shown, embodiments of the present invention also relate to a substantially horizontal construction for energy storage. Such a construction may comprise the same characteristics and features as the tower being described above. In some embodiments, such a substantially horizontal construction may be a construction for supporting a solar panel. By way of illustration, embodiments of the present invention not being limited thereto, an exemplary construction is shown in FIG. 9. The construction comprises one or more duplex compressed pressure vessels 902 forming the support for a solar panel 904.

Figure 10:
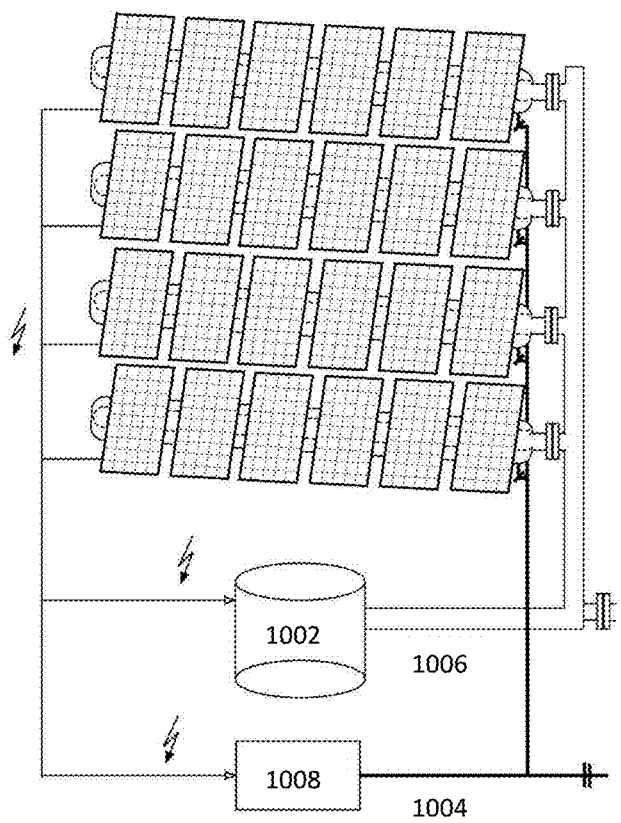
FIG. 10 illustrates a cluster of a plurality of energy storage constructions comprising solar panels, according to an embodiment of the present invention.

FIG. 10 illustrates a cluster of a plurality of energy storage constructions comprising solar panels, coupled together to form a full energy storage system. In the system, an electrolyser 1002 is shown, wherein hydrogen gas 1006 is produced, whereby the hydrogen gas 1006 will be stored in one of the vessels of the one or more compressed pressure vessels of the structure. In the particular example shown, also an air separation unit 1008 for producing nitrogen 1004 is provided, whereby the nitrogen gas 1004 also can be stored in a vessel of the one or more compressed pressure vessel in the structure.

Advantageously, the electrolyser 1002 and the air separation unit 1008 may be powered by the solar panels of the system. In this way the solar energy is converted into hydrogen and nitrogen gas, which can be harvested at a later moment in time. This energy conversion allows storage of energy in the form of chemical components.

Figure 11:
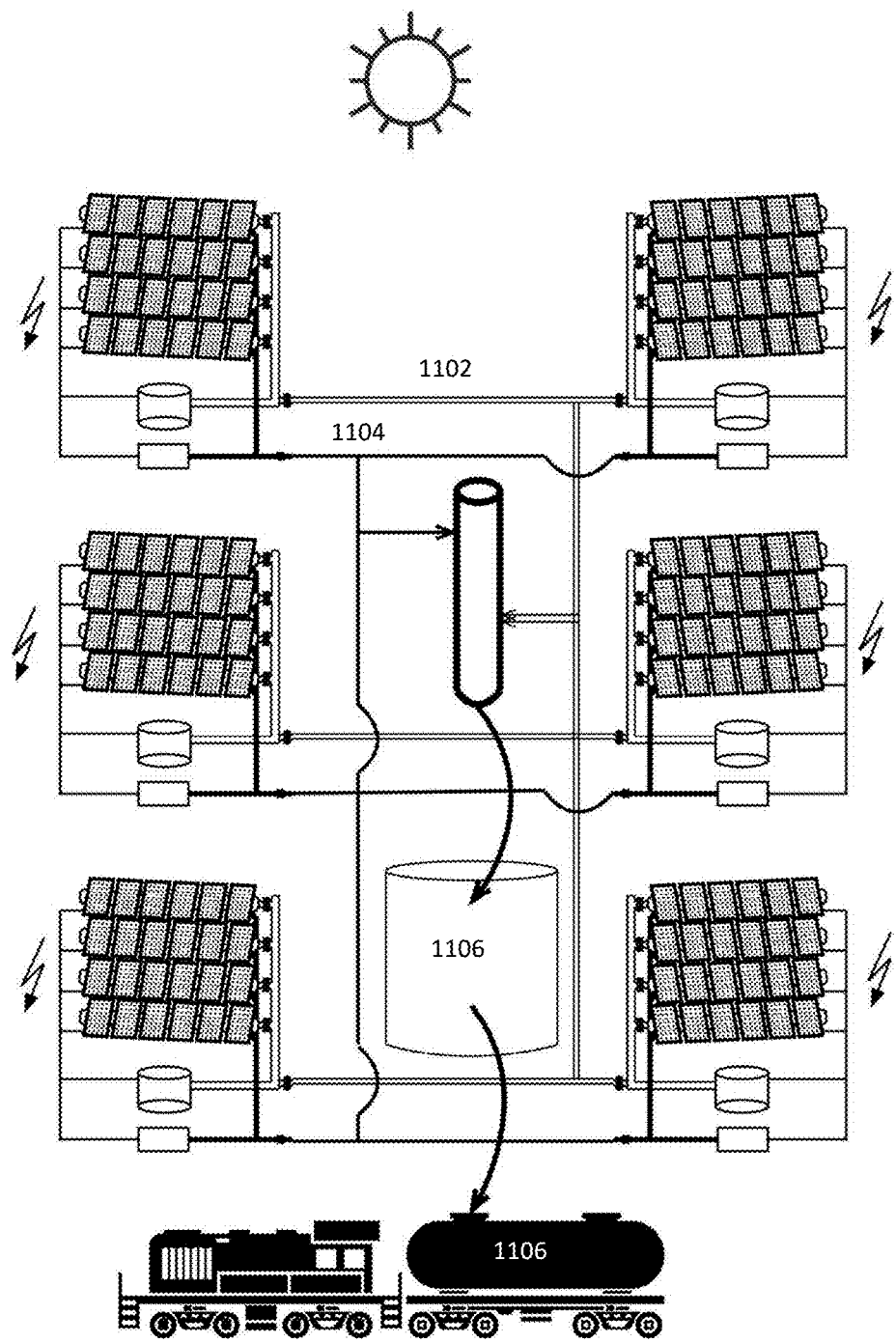
FIG. 11 illustrates a system comprising a field of a plurality of energy storage construction clusters as well as an ammonia production unit, according to an embodiment of the present invention.

FIG. 11 illustrates a system that comprises a field of a plurality of energy storage (clusters) as shown in FIG. 10, whereby furthermore a production unit for producing a further chemical composition is provided. In the example shown, the production unit is an ammonia production unit. By selecting the number of hydrogen 1102 and nitrogen 1104 storage vessels appropriately, the production of the further chemical composition, such as for example ammonia 1106, can be a continuous production, e.g. a 24/7 production. For some further chemical compositions this may be advantageous since the production process may be difficult and/or energy intensive to start or stop. A typical Haber/Bosch reaction is best kept in a continuous operating, without process interruptions. If not, the production yield will be drastically negatively affected.

The produced ammonia 1106 can also be stored and at regular moments in time been harvested. The above is especially advantages for harvesting energy from remote areas, such as for example for harvesting solar energy from a desert. Solar energy is efficiently produced during the day, but not during night. By conversion of the solar energy during the day towards hydrogen and nitrogen, the two essential basic components are made for generating ammonia, which then can be performed in a 24/7 manner.

In yet another aspect, the component as described above, whereby a single inner vessel segment is used or an assembly of interconnected inner vessel segments is used that are fluidly connected with each other, can be used as component for a pipeline or as a pipeline. It is to be noted that the number of input and output ports in some embodiments of the pipeline embodiments can be limited, e.g. it may be sufficient to have an inlet near the start of the pipeline and an outlet near the end of the pipeline. Other components may be mutates mutandis.

In a further aspect, the present invention relates to an energy storage construction, e.g. an energy storage tower or a substantially horizontal construction being build up from compressed pressure vessels, whereby at least one compressed pressure vessel is a compressed pressure vessel as described in the first aspect. The energy tower thus is adjusted for storing hydrogen. The energy storage construction furthermore may be characterised by features and advantages of the compressed pressure vessels as described in the first aspect. In advantageous embodiments, the outer segment of the compressed pressure vessel according to an embodiment of the first aspect is adapted for actively storing and collecting a further gas such as nitrogen or carbon dioxide, such that both hydrogen and the further gas can be used in the production of a chemical composition. Such a chemical composition typically may be a composition having a higher density than hydrogen and having an industrial relevance. According to embodiments of the present invention, the energy tower may thus have the capability of storing two different gasses or fluids, one of them being hydrogen. As indicated when describing the compressed pressure vessels, hydrogen is typically stored in an inner segment of the dual segment compressed pressure vessel, such that diffusion of hydrogen out of the compressed pressure vessel is reduced and such that deterioration of the compressed pressure vessel by hydrogen, resulting in a reduction of construction strength can be reduced or even avoided. The energy construction furthermore may comprise features of an energy storage tower as described in International patent application WO2014/139967, incorporated herein by reference.

In one aspect the present invention also relates to the use of an energy construction as described in the second aspect, the energy construction being build up from compressed pressure vessels as described in the first aspect, for the storage of hydrogen. Advantageously, such energy towers can be used for storing hydrogen for use in the production of a chemical composition by a hydrogenation of hydrogen gas. In other embodiments such energy constructions can be used for storing hydrogen for use in the production of any of ammonia, methane or nitric acid. Advantageously, other reagens such as nitrogen or carbon dioxide also may be stored in the energy towers, advantageously in outer segments of dual vessel compressed pressure vessels of the energy constructions.

REFERENCE NUMERALS 102 burst valve
104 $N_2$ or $CO_2$
106 $H_2$
108 inlet/outlet $H_2$
110 inlet/outlet $N_2$ or $CO_2$
112 balanced pressure
202 multiple inner segments
302 springs
304 elastomers
502 Pressure tight connection means between 2 outer wall segments of the dCPV
504 lifting connection point
506 inner wall
508 outer wall
602 Joining technique for inner wall (e.g. thermal welding of plastics tubing)
702 distance keeper between outer wall and inner wall
802 hydraulic lifters (jacks)
902 duplex compressed pressure vessels
904 solar panel
1002 electrolyser
1004 nitrogen gas
1006 hydrogen gas
1008 air separation unit
1102 hydrogen
1104 nitrogen
1106 ammonia

The invention claimed is:

1. A component for an energy storage construction or for a pipeline, the component comprising an assembly of connected compressed pressure vessels, wherein the assembly of connected compressed pressure vessels comprises:
one or more first segments, the one or more first segments including one or more inner segments, wherein the one or more inner segments comprise a port for filling or emptying the inner segment and wherein the inner segment is suitable for storing hydrogen gas, and
one or more second segment, the one or more second segments including one or more outer segments, wherein the one or more outer segments comprise a port for filling or emptying the one or more outer segments with an other gas different from hydrogen gas, so as to temporarily store the other gas, and
wherein, in the compressed pressure vessel, the pressure of the outer segment and the pressure of the inner segment balance, and a wall of the outer segment is of greater strength than a wall of the inner segment.

2. The component for an energy storage construction or for a pipeline according to claim 1, wherein the assembly of connected compressed pressure vessels is a plurality of connected compressed pressure vessels all have closed head caps, forming individual compressed pressure vessels or wherein the assembly comprises a plurality of second, outer, segments joint-connected to each other.

3. The component for an energy storage construction or for a pipeline according to claim 2, wherein the inner segment is a single segment inserted into the plurality of joint-connected second outer segments or wherein the inner segment is an assembly of joint-connected first, inner segments.

4. The component for an energy storage construction or for a pipeline according to claim 1, wherein the component comprises distance keepers for aligning the one or more inner segments with respect to the one or more outer segments.

5. The component for an energy storage construction or for a pipeline according to claim 4, wherein the distance keepers are installed at the inside of the one or more outer segments, are installed at the outside of the one or more inner segments, or are installed at positions where inner or outer segments have joint connections.

6. A compressed pressure vessel suitable for serving as a construction element for building energy storage constructions thereof or as part of a pipeline, the compressed pressure vessel comprising:
a first segment, the first segment being an inner segment, wherein the inner segment comprises a port for filling or emptying the inner segment and wherein the inner segment is suitable for storing hydrogen gas, and
a second segment, the second segment being an outer segment, wherein the outer segment comprises a port for filling or emptying the outer segment with an other gas different from hydrogen, so as to temporarily store the other gas,
wherein the outer segment is substantially fully encompassing the inner segment, and
wherein, in the compressed pressure vessel, the pressure of the outer segment and the pressure of the inner segment balance, and a wall of the outer segment is of greater strength than a wall of the inner segment.

7. The compressed pressure vessel according to claim 6, wherein the inner segment suitable for storing hydrogen includes a wall made of, or is inner coated or lined with, a low hydrogen diffusion or permeation material, Polyethylene, or a composite material based on carbon, glass or aramide fibers.

8. The compressed pressure vessel according to claim 7, wherein the wall of the inner segment is coated with any of a $Al/Al_2O_3$ coating, a double layer $Al_2O_3$/Fe—Al coating, grown oxides, an Al—Si coating, or a Graphene coating.

9. The compressed pressure vessel according to claim 6, wherein the outer segment is made of a construction steel.

10. The compressed pressure vessel according to claim 6, wherein a plurality of inner segments are provided.

11. The compressed pressure vessel according to claim 10, wherein the plurality of inner segments provided have an inlet combined into a single flange or distribution head.

12. The compressed pressure vessel according to claim 6, wherein the inner segment is spaced from the walls of the outer segment by spacers.

13. The compressed pressure vessel according to claim 12,
wherein the spacers are any or a combination of springs or elastic elements, or
wherein the spacers are adapted such that the inner segment is moveable for adjusting a position of the inner segment to a sealing position of the inner segment when it is to be connected to another inner segment during construction of an energy storage construction.

14. The compressed pressure vessel according to claim 6, wherein the compressed pressure vessel or an outlet port of the outer segment comprises a leakage detector for detecting leakage of hydrogen from the inner segment to the outer segment.

15. The compressed pressure vessel or a pipeline according to claim 6, wherein the construction of the inner segment and the outer segment is such that the volume of the inner segment and the volume of the outer segment are fixed, the construction of the inner segment and the outer segment being adapted for storing hydrogen and the other fluid at the same pressure.

16. The compressed pressure vessel according to claim 6, wherein the compressed pressure vessel is configured as part of a pipeline, wherein the port of the first segment includes an inlet for filling the first segment, the inlet being at a start of the part of the pipeline, and the compressed pressure vessel includes an outlet for emptying the first segment, the outlet being at an end of the part of the pipeline.

17. A pipeline comprising the compressed pressure vessel according to claim 6.

18. An energy storage construction comprising at least one compressed pressure vessel or a pipeline comprising at least one compressed pressure vessel, the compressed pressure vessel comprising:
a first segment, the first segment being an inner segment, wherein the inner segment comprises a port for filling or emptying the inner segment and wherein the inner segment is suitable for storing hydrogen gas, and
a second segment, the second segment being an outer segment, wherein the outer segment comprises a port for filling or emptying the outer segment with an other gas different from hydrogen gas, so as to temporary store the another gas,
wherein the outer segment is substantially fully encompassing the inner segment, and
wherein, in the compressed pressure vessel, the pressure of the outer segment and the pressure of the inner segment balance, and a wall of the outer segment is of greater strength than a wall of the inner segment.

19. The energy storage construction or a pipeline according to claim 18, wherein all constructive elements of the energy storage construction are compressed pressure vessels comprising:
a first segment, the first segment being an inner segment, wherein the inner segment comprises an inlet for filling or emptying the inner segment and wherein the inner segment is suitable for storing hydrogen gas, and
a second segment, the second segment being an outer segment, the outer segment adapted for being filled with an other gas different from hydrogen gas,
wherein the outer segment is substantially fully encompassing the inner segment.

20. The energy storage construction or a pipeline according to claim 18, wherein the construction is a substantially horizontal construction supporting a solar panel, or wherein the construction is a substantially vertical construction.

21. The energy storage construction or a pipeline according to claim 18, the energy storage construction being adapted for the production of a chemical composition by a hydrogenation of hydrogen gas.

22. The energy storage construction or a pipeline according to claim 18, the energy storage construction being adapted for the production of any of ammonia, methane or nitric acid.

* * * * *